United States Patent
Park et al.

(10) Patent No.: US 11,745,623 B2
(45) Date of Patent: Sep. 5, 2023

(54) VEHICLE AND CONTROL METHOD OF ADJUSTING PREHEATING TEMPERATURE OF BATTERY

(71) Applicants: Hyundai Motor Company, Seoul (KR); Kia Corporation, Seoul (KR)

(72) Inventors: Sang Jin Park, Gyeonggi-do (KR); Haewon Park, Gyeonggi-do (KR); Yonghoon Kim, Daejeon (KR); Seyoung Lee, Seoul (KR); Won Chul Shin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 8 days.

(21) Appl. No.: 17/556,327

(22) Filed: Dec. 20, 2021

(65) Prior Publication Data

US 2022/0281354 A1    Sep. 8, 2022

(30) Foreign Application Priority Data

Mar. 3, 2021    (KR) .................. 10-2021-0027948

(51) Int. Cl.
| | |
|---|---|
| *B60L 58/27* | (2019.01) |
| *B60L 58/12* | (2019.01) |
| *H01M 10/48* | (2006.01) |
| *H01M 10/615* | (2014.01) |
| *H01M 10/625* | (2014.01) |
| *H01M 10/63* | (2014.01) |

(52) U.S. Cl.
CPC ............... *B60L 58/27* (2019.02); *B60L 58/12* (2019.02); *H01M 10/486* (2013.01); *H01M 10/615* (2015.04); *H01M 10/625* (2015.04); *H01M 10/63* (2015.04); *B60L 2240/545* (2013.01); *H01M 2220/20* (2013.01)

(58) Field of Classification Search
CPC ............. H01M 10/486; H01M 10/615; H01M 10/625; H01M 10/63; H01M 2220/20; B60L 58/27; B60L 58/12; B60L 2240/545
See application file for complete search history.

(56) References Cited

U.S. PATENT DOCUMENTS

| | | | |
|---|---|---|---|
| 2013/0244066 A1* | 9/2013 | Kang ................ | H01M 10/6554 429/62 |
| 2017/0305294 A1* | 10/2017 | Hettrich .................. | B60L 58/27 |

FOREIGN PATENT DOCUMENTS

| | | |
|---|---|---|
| JP | 2019-146441 A | 8/2019 |
| JP | 2020-014301 A | 1/2020 |

* cited by examiner

*Primary Examiner* — Adam A Arciero
(74) *Attorney, Agent, or Firm* — Fox Rothschild LLP

(57) ABSTRACT

A vehicle includes: a battery; a battery thermostat; at least one sensor; and a controller configured to determine a preheating temperature of the battery based on an outside temperature of the vehicle and a first state of charge of the battery, and control the battery thermostat based on the preheating temperature, the first state of charge being identified through the at least one sensor.

10 Claims, 7 Drawing Sheets

FIG. 4

| T2 | | OUTSIDE TEMPERATURE(T1) | | | | | | |
|---|---|---|---|---|---|---|---|---|
| | | 10 | 15 | 20 | 25 | 30 | 35 | 40 |
| CURRENT SOC (%) | 10 | | | | | | | |
| | 11 | | | | | | | |
| | 12 | | | | | | | |
| | 13 | | | | | | | |
| | 14 | | | | | | | |
| | 15 | | | $T2_{20-15}$ | | | | |
| | ⋮ | | | | | | | |
| | 77 | | | | | | | |
| | 78 | | | | | | | |
| | 79 | | | | | | | |
| | 80 | | | | | | | |

VEHICLE AND CONTROL METHOD OF ADJUSTING PREHEATING TEMPERATURE OF BATTERY

CROSS-REFERENCE TO RELATED APPLICATION

This application claims under 35 U.S.C. § 119 the benefit of Korean Patent Application No. 10-2021-0027948, filed on Mar. 3, 2021 in the Korean Intellectual Property Office, the entire contents of which are incorporated herein by reference.

BACKGROUND

1. Technical Field

The disclosure relates to a vehicle and a control method of adjusting a preheating temperature of a battery, more particularly, to the vehicle and control method configured to adjust the preheating temperature for each state of charge of the battery in order to preheat the battery to be outside a conventional general temperature range, without exceeding a limit temperature.

2. Description of the Related Art

Recently, technological developments have occurred in fast charging of vehicles, e.g., electric vehicles. Fast charging of vehicles may improve user convenience due to a decrease in charging time, and result in lower costs because no additional battery cell is required.

When charging a vehicle battery, if the battery is charged with a charging current of a certain level or higher at a low temperature, lithium plating and electrolyte reaction byproducts may be generated at a cathode. Also, when the battery is repeatedly charged and discharged, electrolyte reaction byproducts may grow. In addition, when electrolyte reaction byproducts exceed a certain level, a battery separator may be damaged and/or battery internal short circuit may occur, which may lead to an increase in the risk of ignition.

Accordingly, it is crucial to charge an automotive battery at a certain temperature or higher, and fast charging is required to be performed at a high temperature exceeding a temperature generally applied in the conventional art in order to shorten a charging time of an automotive battery. However, an automotive battery may deteriorate when it is exposed to high temperatures for an extended period of time or above a limit temperature.

Thus, the development of technology for allowing an automotive battery to be exposed to high temperatures only for a short period of time while not exceeding a limit temperature during charging is required.

SUMMARY

The disclosure provides a vehicle and a control method thereof that may reduce a charging time of a battery of a vehicle, as compared to a conventional charging time.

For example, the vehicle and the control method thereof may shorten the charging time of the battery by adjusting a preheating temperature for each state of charge of the battery in order to preheat the battery to enable a temperature of the battery to be out of a conventional general temperature range, without exceeding a limit temperature.

Additional aspects of the disclosure will be set forth in part in the description which follows and, in part, will be obvious from the description, or may be learned by practice of the disclosure.

According to an embodiment of the disclosure, there is provided a vehicle, including: a battery; a battery thermostat; at least one sensor; and a controller configured to determine a preheating temperature of the battery based on an outside temperature of the vehicle and a first state of charge of the battery, and control the battery thermostat based on the preheating temperature, the first state of charge being identified through the at least one sensor.

The vehicle further includes a storage, and wherein the controller is configured to determine reference preheating temperatures for each state of charge of the battery or for each predetermined outside temperature, as the preheating temperature corresponding to the first state of charge and the outside temperature, the reference preheating temperatures being stored in the storage.

The controller is configured to identify a maximum temperature of the battery, the maximum temperature corresponding to the first state of charge and the outside temperature, and calculate the preheating temperature based on a predetermined reference temperature corresponding to a start of charging of the battery, the maximum temperature, and a predetermined limit temperature, in response to a comparison of the maximum temperature and the predetermined limit temperature of the battery.

The preheating temperature is obtained by subtracting a difference between the maximum temperature and the predetermined limit temperature from the predetermined reference temperature, when the maximum temperature is greater than the predetermined limit temperature.

The preheating temperature is obtained by adding a difference between the maximum temperature and the predetermined limit temperature to the predetermined reference temperature, when the maximum temperature is equal to or less than the predetermined limit temperature.

The controller is configured to calculate a first power consumption of the battery thermostat, the first power consumption corresponding to the preheating temperature, calculate a second state of charge of the battery based on the calculated first power consumption, and reset the preheating temperature of the battery based on the second state of charge of the battery.

The controller is configured to calculate a second power consumption of the battery thermostat, the second power consumption corresponding to the reset preheating temperature, calculate a third state of charge of the battery based on the second power consumption, identify an amount of change between the second state of charge and the third state of charge, and reset the preheating temperature of the battery based on the third state of charge in response to the identifying of the amount of change.

According to an embodiment of the disclosure, there is provided a control method of a vehicle, the control method including: determining, by a controller, a preheating temperature of a battery of the vehicle based on an outside temperature of the vehicle and a first state of charge of the battery; and controlling, by the controller, a battery thermostat of the vehicle based on the preheating temperature.

The determining of the preheating temperature includes determining reference preheating temperatures for each state of charge of the battery or for each predetermined outside temperatures as the preheating temperature corresponding to the first state of charge and the outside temperature.

The determining of the preheating temperature includes identifying a maximum temperature of the battery, the maximum temperature corresponding to the first state of charge and the outside temperature, and calculating the preheating temperature based on a predetermined reference temperature corresponding to a start of charging of the battery, the maximum temperature, and a predetermined limit temperature, in response to a comparison of the maximum temperature and the predetermined limit temperature of the battery.

The preheating temperature is obtained by subtracting a difference between the maximum temperature and the predetermined limit temperature from the predetermined reference temperature, when the maximum temperature is greater than the predetermined limit temperature.

The preheating temperature is obtained by adding a difference between the maximum temperature and the predetermined limit temperature to the predetermined reference temperature, when the maximum temperature is equal to or less than the predetermined limit temperature.

The control method further includes calculating a first power consumption of the battery thermostat, the first power consumption corresponding to the preheating temperature; calculating a second state of charge of the battery based on the calculated first power consumption; and resetting the preheating temperature of the battery based on the second state of charge of the battery.

The control method further includes calculating a second power consumption of the battery thermostat, the second power consumption corresponding to the reset preheating temperature; calculating a third state of charge of the battery based on the second power consumption; identifying an amount of change between the second state of charge and the third state of charge; and resetting the preheating temperature of the battery based on the third state of charge, in response to the identifying of the amount of change.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 is a diagram illustrating a preheating temperature table of a battery according to an embodiment;

DETAILED DESCRIPTION

Figure 1:
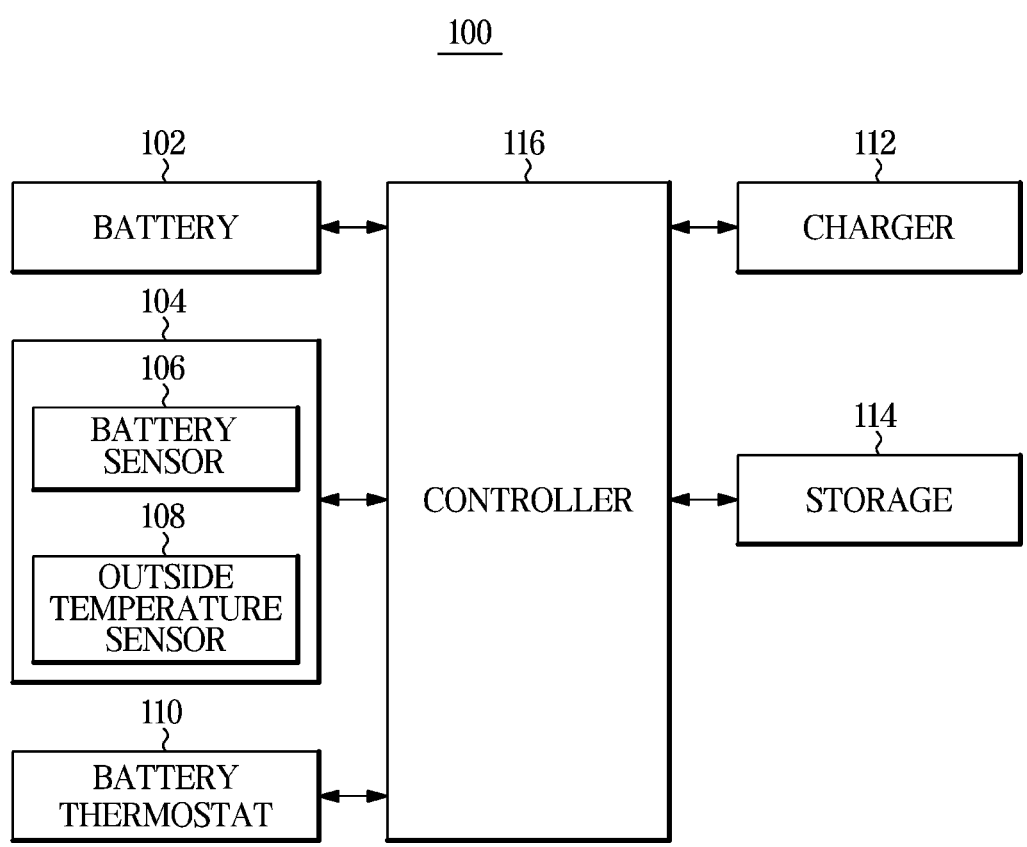
FIG. 1 is a block diagram illustrating a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It will be understood that when an element is referred to as being "connected" to another element, it can be directly or indirectly connected to the other element, wherein the indirect connection includes "connection" via a wireless communication network.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a block diagram illustrating a vehicle 100 according to an embodiment.

The vehicle 100 may include a battery 102, at least one temperature sensor 104, a battery thermostat 110, a charger 112, a storage 114 and/or a controller 116.

The battery 102 may supply electrical energy to a driving motor and/or an electric device component of the vehicle 100.

The battery 102 may be charged from an external power source. For example, the battery 102 may be charged through a commercial direct current power source or the like at a charging station.

The at least one temperature sensor 104 may include a battery sensor 106 and/or an outside temperature sensor 108.

The battery sensor 106 may measure a temperature of the battery 102. The battery sensor 106 may measure an output voltage, an output current and/or a rated capacity, and the like.

For example, the controller 114 may calculate a state of charge (SOC) of the battery 102 based on an output signal of the battery sensor 106. The SOC of the battery 102 may indicate a degree to which electrical energy is stored in the battery 102. In general, the SOC has a value of 0 to 100 percent, and may indicate a degree to which the battery 102 is charged between a fully discharged state (0 percent) and a fully charged state (100 percent).

The outside temperature sensor 108 may measure an outside air temperature of the vehicle 100.

The battery thermostat 110 may increase the temperature of the battery 102. For example, the battery thermostat 110 may include a heater (not shown) capable of preheating a battery and/or an air conditioning system, etc.

The charger 112 may include a charging circuit (not shown) for charging the battery 102, and one of conventional various charging circuits may be applied to the charging circuit.

The storage 114 may store various data used by at least one constituent component (the battery 102, the at least one temperature sensor 104, the battery thermostat 110, the charger 112 and/or the controller 116) of the vehicle 100. For example, the storage 114 may store a software program and input data or output data about commands related to the software program. The storage 114 may include a volatile memory and/or a non-volatile memory.

The storage 114 may store a reference preheating temperature for each SOC of the battery 102 at every predetermined outside temperature.

The controller 116 (also referred to as a control circuit or a processor) may control at least one other constituent component (e.g., a hardware constituent component such as the battery 102, the at least one temperature sensor 104, the battery thermostat 110, the charger 112 and/or the storage 114, or a software constituent component such as a software program) of the vehicle 100. Also, the controller 116 may perform various data processing and data operations.

The controller 116 may include a processor (not shown) and a memory (not shown).

The controller 116 may include a battery management system (BMS, not shown) that monitors a state of the battery 102.

Figure 2:
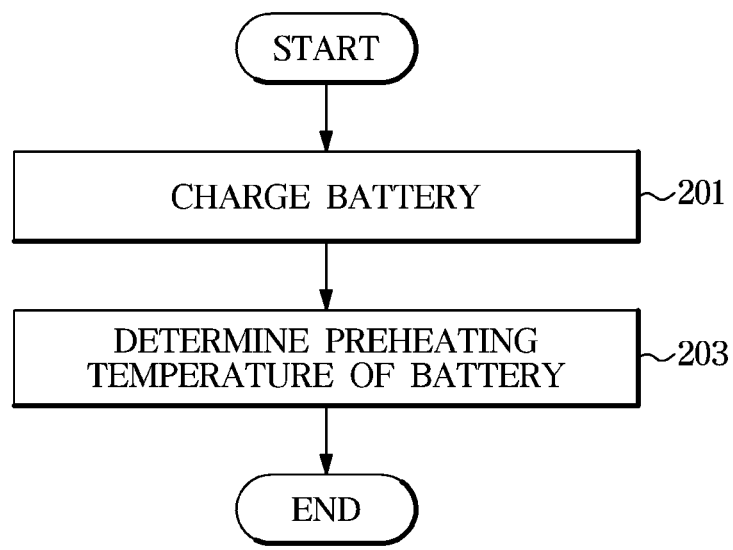
FIG. 2 is a flowchart illustrating operations of a vehicle according to an embodiment.
Figure 3:
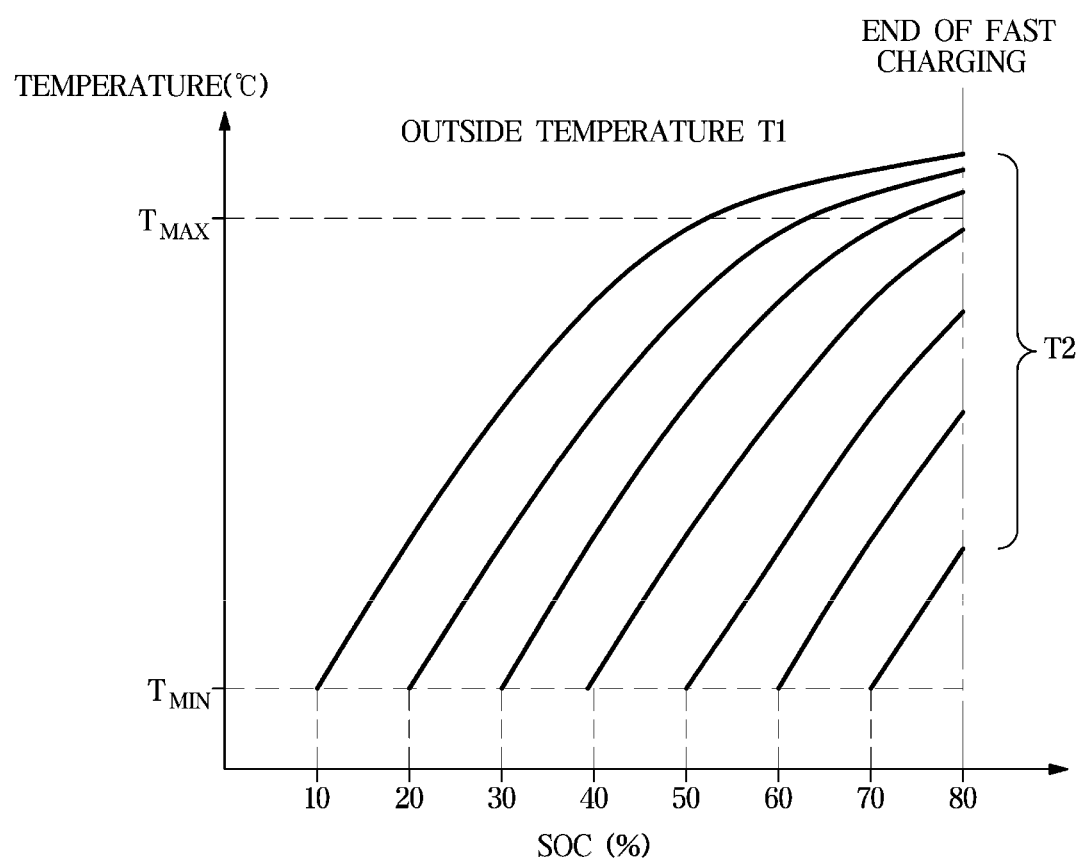
FIG. 3 is a graph illustrating a temperature profile of a battery according to an embodiment.

FIG. 2 is a flowchart illustrating operations of the vehicle 100 (and/or the controller 116 of the vehicle 100) according to an embodiment. FIG. 3 is a graph illustrating a temperature profile of the battery 102 according to an embodiment. FIG. 4 is a diagram illustrating a preheating temperature table of the battery 102 according to an embodiment.

Referring to FIG. 2, the vehicle 100 may charge the battery 102 based on each condition of a SOC of the battery 102 and a predetermined outside temperature of the vehicle 100 (201).

The vehicle 100 may charge the battery 102, for example, rapidly charge the battery 102 for each SOC of the battery 102 at every predetermined outside temperature of the vehicle 100.

The vehicle 100 may determine a preheating temperature of the battery 102 corresponding to each of the conditions of the SOC of the battery 102 and the predetermined outside temperature of the vehicle 100 based on the charging of the battery 102 (203).

When charging the battery 102 for each SOC of the battery 102 at every predetermined outside temperature of the vehicle 100, the vehicle 100 may determine the preheating temperature corresponding to each of the conditions by calculating the preheating temperature of the battery 102 based on temperature increase rate data of the battery 102.

For example, when rapidly charging the battery 102 for each SOC of the battery 102 at every predetermined outside temperature of the vehicle 100, the temperature increase rate data of the battery 102 may be the temperature profile of the battery 102 shown in FIG. 3. The temperature profile of the battery 102 may show different tendencies depending on characteristics such as resistance, a heating value and/or a specific heat, etc., of the battery 102. A charging current and a current application time of the battery 102 are determined for each SOC and for each temperature, and thus the temperature profile of the battery 102 may be derived based on the determined charging current and current application time of the battery 102.

Referring to FIG. 3, the vehicle 100 may identify a maximum temperature (also referred to as a maximum reached temperature) of the battery 102 based on charging, for each SOC (10, 20, 30, 40, 50, 60, 70 and 80%) of the battery 102 at every outside temperature T1. A reference temperature $T_{MIN}$ (also referred to as a starting set temperature for ultra-fast charging) corresponding to a start of charging of the battery 102 and a limit temperature $T_{MAX}$ of the battery 102 may be determined in advance at every outside temperature T1.

Based on the temperature profile of the battery 102 shown in FIG. 3, the vehicle 100 may determine the preheating temperature of the battery 102 corresponding to each of the predetermined conditions, and store the preheating temperature in the storage 114. For example, the vehicle 100 may generate the preheating temperature table of the battery 102 as shown in FIG. 4, and store the preheating temperature table in the storage 114.

For example, as shown in FIG. 4, the vehicle 100 may generate the preheating temperature table including a corresponding reference preheating temperature for each SOC (e.g., 10, 11, 12, 13, 14, 15, . . . 79 and 80%) of the battery 102 at every predetermined outside temperature (e.g., 10, 15, 20, 25, 30, 35 and 40 degrees).

The vehicle 100 may determine the corresponding reference preheating temperature for each SOC of the battery 102 at every predetermined outside temperature, based on a comparison of a maximum temperature $T2_{T1\text{-}X1}$ of the battery 102 based on charging and a predetermined limit temperature $T_{MAX}$ of the battery 102.

For example, when $T2_{T1\text{-}X1} > T_{MAX}$, a preheating temperature $T_{result1}$ of the battery 102 may be calculated by Equation 1 provided below.

$$T_{result1} = T_{MIN} - (T2_{T1\text{-}X1} - T_{MAX})$$ [Equation 1]

($T_{MIN}$: the predetermined reference temperature corresponding to the start of charging of the battery ($T_{MIN} > 60°$ C. or $T_{MIN} > 50°$ C.), $T_{MAX}$: the predetermined limit temperature of the battery ($T_{MAX} > 70°$ C.), T1: outside temperature, T2: the maximum temperature of the battery based on charging, $T2_{T1\text{-}X1}$: the maximum temperature of the battery based on charging when the outside temperature is T1° C. and SOC is X1%).

When $T2_{T1-X1} < T_{MAX}$, a preheating temperature $T_{result2}$ of the battery 102 may be calculated by Equation 2 provided below.

$$T_{result2} = T_{MIN} + (T_{MAX} - T2_{T1-X1})  \quad \text{[Equation 2]}$$

Figure 5:
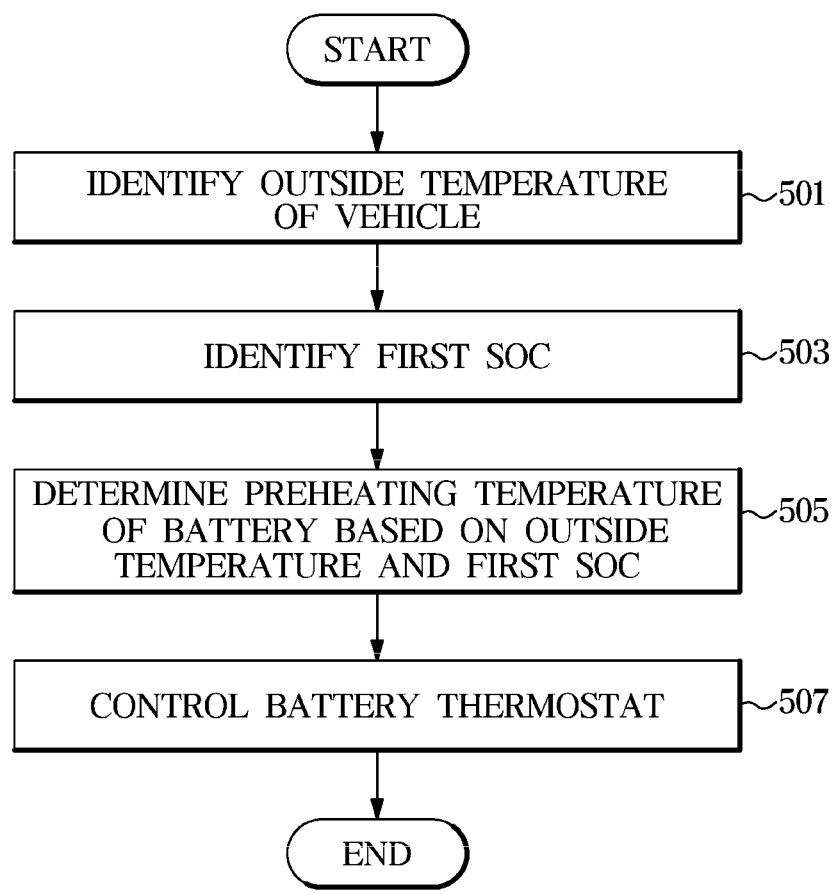
FIG. 5 is a flowchart illustrating operations of a vehicle according to an embodiment.

FIG. 5 is a flowchart illustrating operations of the vehicle 100 (and/or the controller 116 of the vehicle 100) according to an embodiment.

The vehicle 100 may identify an outside temperature of the vehicle 100 through the outside temperature sensor 108 (501).

The vehicle 100 may identify a first SOC of the battery 102 through the battery sensor 106 (503).

The vehicle 100 may determine a preheating temperature of the battery 102 based on the outside temperature and the first SOC (505).

According to an embodiment, the vehicle 100 may set, as the preheating temperature of the battery 102, a reference preheating temperature corresponding to the outside temperature identified in operation 501 and the first SOC identified in operation 503 among reference preheating temperatures for each SOC of the battery 102 at every predetermined outside temperature.

For example, the preheating temperature table of the battery 102 shown in FIG. 4 may be stored in the storage 114 of the vehicle 100, and the vehicle 100 may identify the preheating temperature corresponding to the outside temperature and the first SOC in the preheating temperature table.

According to another embodiment, the vehicle 100 may identify a maximum temperature of the battery 102 corresponding to the outside temperature and the first SOC, and calculate the preheating temperature of the battery 102 based on a comparison of the maximum temperature of the battery 102 corresponding to the outside temperature and the first SOC and a predetermined limit temperature of the battery 102.

For example, a corresponding maximum temperature of the battery 102 for each outside temperature and for each SOC may be stored in advance, and the vehicle 100 may identify the maximum temperature of the battery 102 corresponding to the outside temperature and the first SOC based on the stored maximum temperatures.

When the maximum temperature of the battery 102 corresponding to the outside temperature and the first SOC is greater than the predetermined limit temperature, the vehicle 100 may calculate a first preheating temperature based on Equation 1 above.

When the maximum temperature of the battery 102 corresponding to the outside temperature and the first SOC is equal to or less than the predetermined limit temperature, the vehicle 100 may calculate the first preheating temperature based on Equation 2 above.

The vehicle 100 may control the battery thermostat 110 based on the preheating temperature of the battery 102 (507).

The vehicle 100 may control the battery thermostat 110 so that a temperature of the battery 102 may be preheated to the determined preheating temperature of the battery 102.

In addition to the embodiments described above, the vehicle 100 may calculate a power consumption of the battery thermostat 110. In this example, the power consumption of the battery thermostat 110 corresponds to the preheating temperature determined in operation 505. For example, the vehicle 100 may calculate the power consumption of the battery thermostat 110 corresponding to the determined preheating temperature after the operation 505 and before the operation 507.

The power consumption of the battery thermostat 110 corresponding to the determined preheating temperature may be the amount of power of the battery thermostat 110 required to preheat the battery 102 to the determined preheating temperature.

For example, the vehicle 100 may calculate the power consumption of the battery thermostat 110 corresponding to the determined preheating temperature, based on an estimated time (also referred to as a pre-stored estimated time) required to preheat the battery 102 to the determined preheating temperature and the amount of power (or output current and output voltage) of the battery thermostat 110.

Based on the calculated power consumption, the vehicle 100 may calculate a second SOC of the battery 102, and reset the preheating temperature of the battery 102 based on the second SOC of the battery 102. The vehicle 100 may calculate the second SOC of the battery 102 considering the power consumption of the battery thermostat 110 in the first SOC of the battery 102.

For example, the vehicle 100 may reset, as the preheating temperature of the battery 102, a reference preheating temperature corresponding to the outside temperature and the second SOC among reference preheating temperatures for each SOC of the battery 102 at every predetermined outside temperature.

As another example, the vehicle 100 may identify a maximum temperature of the battery 102 corresponding to the outside temperature and the second SOC, and calculate the preheating temperature of the battery 102 based on a comparison of the maximum temperature of the battery 102 corresponding to the outside temperature and the second SOC and the predetermined limit temperature of the battery 102.

The vehicle 100 may calculate a power consumption of the battery thermostat 110. In this example, the power consumption of the battery thermostat 110 corresponds to the reset preheating temperature. Also, the vehicle 100 may calculate a third SOC of the battery 102 based on the calculated power consumption.

The vehicle 100 may repeatedly perform the operation of calculating the SOC of the battery 102 considering the power consumption of the battery thermostat 110 and the operation of resetting the preheating temperature of the battery 102, based on at least one of a predetermined reference number of times or a predetermined reference amount of change in the SOC of the battery 102.

For example, the vehicle 100 may repeatedly perform the operation of calculating the SOC of the battery 102 considering the power consumption of the battery thermostat 110 and the operation of resetting the preheating temperature of the battery 102, until the amount of change between calculated two SOCs is less than the predetermined reference amount of change (e.g., 1). For example, when the amount of change between the second and third SOCs is equal to or greater than the predetermined reference amount of change, the vehicle 100 may perform the operation of calculating the SOC of the battery 102 considering the power consumption of the battery thermostat 110 and the operation of resetting the preheating temperature of the battery 102 again.

For example, the vehicle 100 may repeatedly perform the operation of calculating the SOC of the battery 102 considering the power consumption of the battery thermostat 110 and the operation of resetting the preheating temperature of the battery 102, only up to the predetermined reference number of times (e.g., 10 times).

For example, although the amount of change between calculated two SOCs is not less than the predetermined reference amount of change (e.g., 1), when the vehicle 100 repeatedly performs the operation of calculating the SOC of the battery 102 considering the power consumption of the battery thermostat 110 and the operation of resetting the preheating temperature of the battery 102 up to the predetermined reference number of times, the vehicle 100 may end the operations according to the embodiment.

Figure 6:
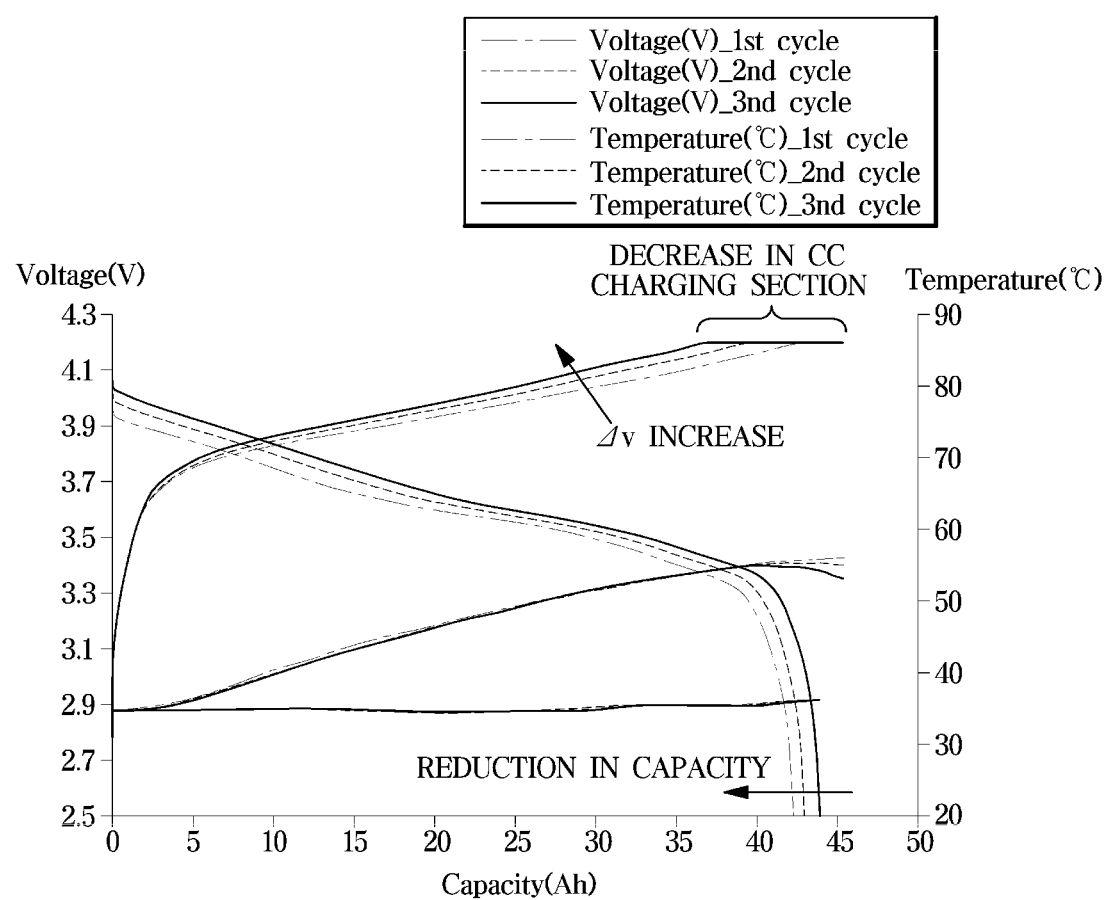
FIG. 6 is a graph illustrating a result when a battery of a conventional vehicle is rapidly charged at a low temperature according to an embodiment.
Figure 7:
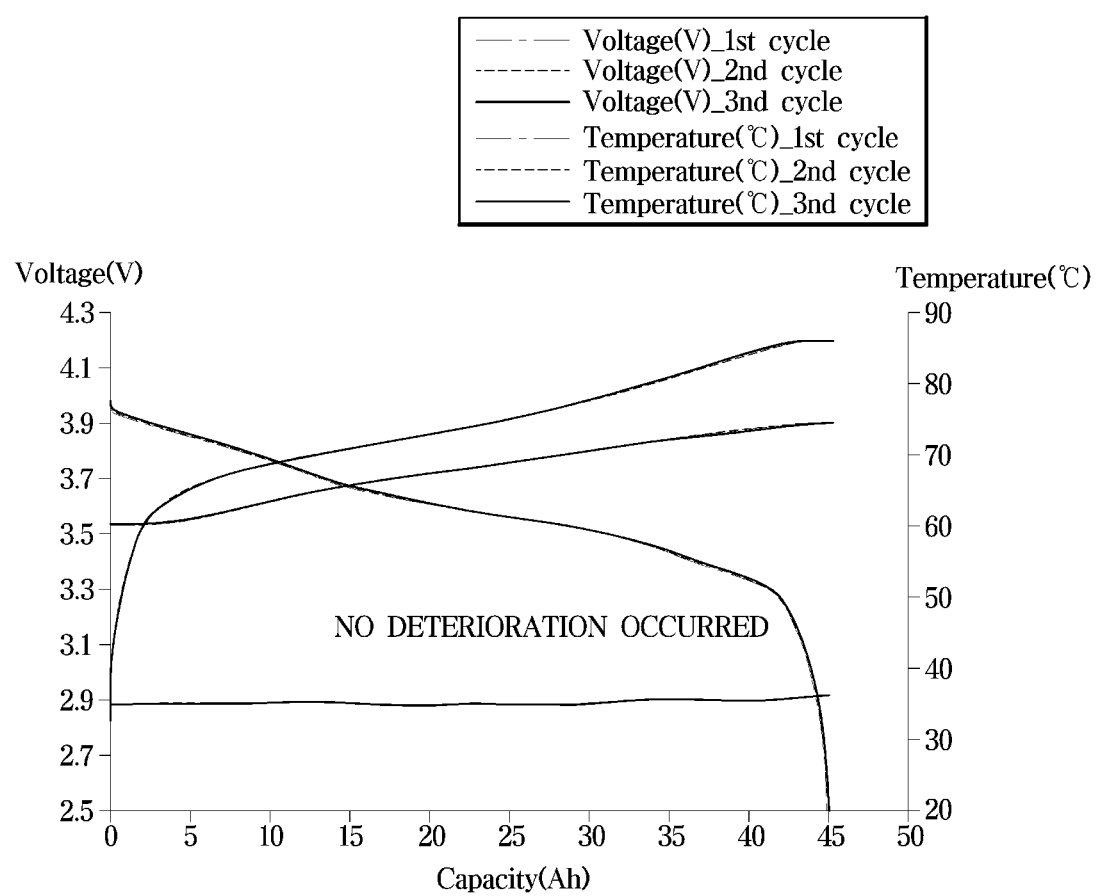
FIG. 7 is a graph illustrating a result when a battery of a vehicle is rapidly charged at a high temperature according to an embodiment.

FIG. 6 is a graph illustrating a result when the battery 102 of a conventional vehicle 100 is rapidly charged at a low temperature according to an embodiment. FIG. 7 is a graph illustrating a result when the battery 102 of the vehicle 100 is rapidly charged at a high temperature according to an embodiment.

Referring to FIG. 6, when the battery 102 of the vehicle 100 is rapidly charged at a temperature of 35 degrees for 15 minutes, it may be confirmed that the amount of change in voltage (ΔV) increases, a rapid charging (cc charging) section decreases, and a capacity of the battery 102 is reduced as a first cycle proceeds to a third cycle. Accordingly, when the battery 102 of the vehicle 100 is rapidly charged at the temperature of 35 degrees for 15 minutes, it may be confirmed that the battery 102 is deteriorated in 3 cycles, and thus 15-minute fast charging of the battery 102 may not be performed.

Referring to FIG. 7, when the battery 102 of the vehicle 100 is rapidly charged at a temperature of 60 degrees for 15 minutes, it may be confirmed that the amount of change in voltage (ΔV) is maintained, the rapid charging section is maintained, and the capacity of the battery 102 is maintained even when the first cycle proceeds to the third cycle. Accordingly, when the battery 102 of the vehicle 100 is rapidly charged at the temperature of 60 degrees for 15 minutes, it may be confirmed that deterioration of the battery 102 does not occur.

As is apparent from the above, according to the embodiment of the disclosure, the vehicle and the control method thereof can rapidly charge a battery of the vehicle at a high temperature, thereby can shorten a charging time of the battery and prevent the battery from deteriorating.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
a battery;
a battery thermostat configured to preheat the battery and including at least one of a heater or an air conditioning system;
a battery sensor configured to measure at least one of an output voltage or an output current and to output a signal based upon the measurement;
an outside temperature sensor configured to measure an outside air temperature of the vehicle; and
a controller including a processor configured to:
calculate a first state of charge (SOC) of the battery based on the signal output by the battery sensor;
identify a maximum temperature of the battery corresponding to the first SOC and the outside air temperature;
determine a preheating temperature of the battery based on a predetermined reference temperature corresponding to a start of charging the battery, the maximum temperature, and a predetermined limit temperature of the battery in response to a comparison of the maximum temperature and the predetermined limit temperature; and
control the battery thermostat based on the determined preheating temperature.

2. The vehicle of claim 1, wherein, when the maximum temperature is greater than the predetermined limit temperature, the controller is configured to:
obtain a difference value between the predetermined limit temperature and the predetermined reference temperature; and
determine the preheating temperature based on a difference between the predetermined reference temperature and the obtained difference value.

3. The vehicle of claim 1, wherein, when the maximum temperature is equal to or less than the predetermined limit temperature, the controller is configured to determine the preheating temperature is obtained by adding a difference between the maximum temperature and the predetermined limit temperature to the predetermined reference temperature.

4. The vehicle of claim 1, wherein the controller is configured to obtain a first power consumption of the battery thermostat, the determined first power consumption corresponding to the preheating temperature,
obtain a second state of charge of the battery based on the calculated first power consumption, and
reset the determined preheating temperature of the battery based on the second state of charge of the battery.

5. The vehicle of claim 4, wherein the controller is configured to:
obtain a second power consumption of the battery thermostat, the second power consumption corresponding to the reset preheating temperature,
obtain a third state of charge of the battery based on the second power consumption,
identify an amount of change between the second state of charge and the third state of charge, and
reset the determined preheating temperature of the battery based on the third state of charge in response to the identifying of the amount of change.

6. A control method of a vehicle, the control method comprising:
obtaining, by a controller including a processor, a first state of charge (SOC) of a battery based on a signal sensed by a battery sensor;
obtaining, by the controller, an outside air temperature sensed by an outside air temperature sensor;
identifying, by the controller, a maximum temperature of the battery corresponding to the first SOC and the outside air temperature;

determining, by the controller, a preheating temperature of the battery based on a predetermined reference temperature corresponding to a start of charging of the battery, the maximum temperature, and a predetermined limit temperature of the battery in response to a comparison of the maximum temperature and the predetermined limit temperature; and controlling, by the controller, a battery thermostat of the vehicle based on the determined preheating temperature.

7. The control method of claim 6, wherein, when the maximum temperature is greater than the predetermined limit temperature, determining the preheating temperature includes:

obtaining a difference value between the predetermined limit temperature and the predetermined reference temperature; and determining the preheating temperature based on a difference between the predetermined reference temperature and the obtained difference value.

8. The control method of claim 6, wherein, when the maximum temperature is equal to or less than the predetermined limit temperature, determining the preheating temperature includes adding a difference between the maximum temperature and the predetermined limit temperature to the predetermined reference temperature.

9. The control method of claim 6, further comprising:

obtaining a first power consumption of the battery thermostat, the determined first power consumption corresponding to the preheating temperature;

obtaining a second state of charge of the battery based on the calculated first power consumption; and resetting the determined preheating temperature of the battery based on the second state of charge of the battery.

10. The control method of claim 9, further comprising:

obtaining a second power consumption of the battery thermostat, the second power consumption corresponding to the reset preheating temperature;

obtaining a third state of charge of the battery based on the second power consumption;

identifying an amount of change between the second state of charge and the third state of charge; and resetting the determined preheating temperature of the battery based on the third state of charge, in response to the identifying of the amount of change.

* * * * *